(12) United States Patent
Ghosh et al.

(10) Patent No.: US 8,820,199 B2
(45) Date of Patent: Sep. 2, 2014

(54) APPARATUS AND METHOD FOR MACHINING POLYMERS WITH CONTROLLED CROYGENIC COOLING

(75) Inventors: Ranajit Ghosh, Macungie, PA (US); Jeffrey Alan Knopf, Allentown, PA (US); Daniel James Gibson, Pen Argyl, PA (US); Thomas Mebrahtu, Lansdale, PA (US); Kevin John Giardiniere, Bethlehem, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 1143 days.

(21) Appl. No.: 12/678,606

(22) PCT Filed: Sep. 20, 2008

(86) PCT No.: PCT/US2008/077144
§ 371 (c)(1),
(2), (4) Date: Mar. 17, 2010

(87) PCT Pub. No.: WO2009/039465
PCT Pub. Date: Mar. 26, 2009

(65) Prior Publication Data
US 2010/0193980 A1    Aug. 5, 2010

Related U.S. Application Data

(60) Provisional application No. 60/994,787, filed on Sep. 21, 2007, provisional application No. 61/012,653, filed on Dec. 10, 2007.

(51) Int. Cl.
*B23B 27/10* (2006.01)
*B26F 3/02* (2006.01)
*B23D 79/00* (2006.01)
*B23Q 11/10* (2006.01)
*B23P 25/00* (2006.01)
*B23C 5/28* (2006.01)
*B26D 7/10* (2006.01)

(52) U.S. Cl.
CPC . *B26F 3/02* (2013.01); *B23D 79/00* (2013.01); *B26D 7/10* (2013.01); *B23Q 11/1053* (2013.01); *B23P 25/003* (2013.01)
USPC .................................................. 82/1.11; 82/50

(58) Field of Classification Search
USPC ................... 82/1.11, 47, 50, 51, 900; 407/11; 239/128; 409/136
See application file for complete search history.

(56) References Cited

U.S. PATENT DOCUMENTS 3,824,739 A    7/1974  Moret et al.
4,990,412 A *  2/1991  Hersey .............................. 429/8

(Continued)

FOREIGN PATENT DOCUMENTS

DE    10 2005 012377 A1    9/2006
WO        2009032709 A1    3/2009

*Primary Examiner* — Will Fridie, Jr.
(74) *Attorney, Agent, or Firm* — Anne B. Kiernan

(57) ABSTRACT

A method and apparatus for discharging a temperature-controlled flow of a resultant fluid (32) containing a throttling gas and cryogenic fluid onto a material (14) for the purpose of maintaining the temperature of the material within a desired temperature range and below the glass transition temperature of the material during machining. Also disclosed is an apparatus and method for deburring or deflashing a machined material by discharging a temperature-controlled flow of a resultant fluid (132) onto a machined material (114) to harden the burrs (134a), then brushing the material (114) to remove the hardened burrs (143a).

15 Claims, 4 Drawing Sheets

(56) References Cited

U.S. PATENT DOCUMENTS

| | | |
|---|---|---|
| 5,394,704 A | 3/1995 | Johnson |
| 6,427,326 B1* | 8/2002 | Soga et al. ............... 29/888.092 |
| 6,513,336 B2 | 2/2003 | Zurecki et al. |
| 7,513,121 B2* | 4/2009 | Zurecki et al. .................... 62/64 |
| 2004/0231559 A1 | 11/2004 | Bloembergen et al. |
| 2005/0107484 A1 | 5/2005 | Cialone et al. |
| 2005/0211029 A1* | 9/2005 | Zurecki et al. ................. 82/1.11 |
| 2006/0086839 A1* | 4/2006 | Meckert et al. ................. 241/23 |
| 2008/0276771 A1* | 11/2008 | Ghosh et al. .................... 82/1.11 |
| 2011/0048183 A1* | 3/2011 | Shin ............................... 82/1.11 |

* cited by examiner

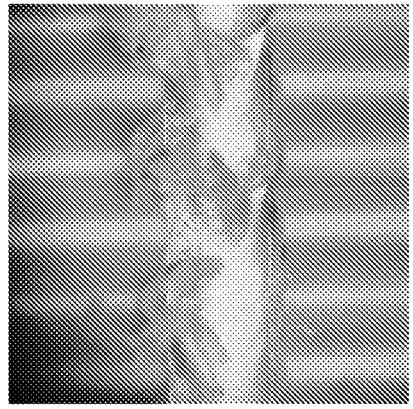
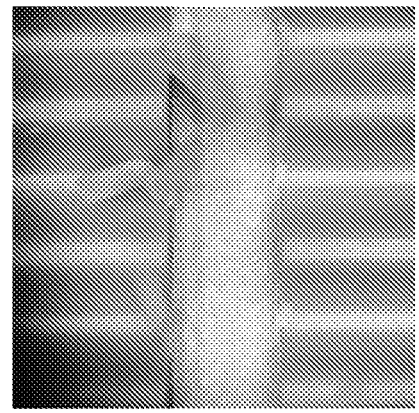
Figure 3A          Figure 3B
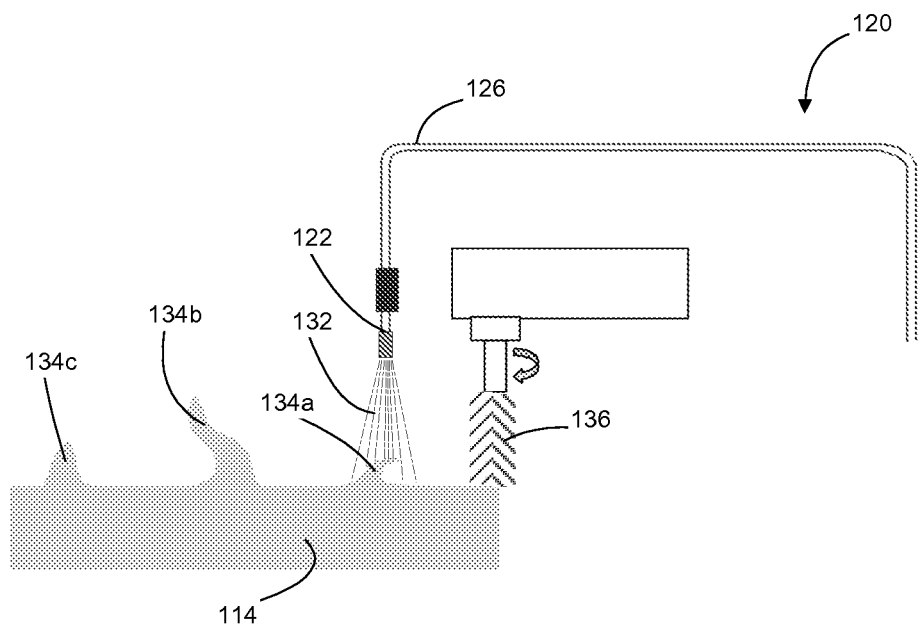
Figure 4

| Sample | Temp of Resultant Fluid | Temp. of Part After Machining | Diameter of Machined Part at 70F / 21C |
|---|---|---|---|
| 1 | none | 105F / 41C | 0.3845in / 0.9766cm |
| 2 | none | 105F / 41C | 0.3846in / 0.9769cm |
| 3 | none | 105F / 41C | 0.3848in / 0.9774cm |
| 4 | -260F / -162C | 55F / 13C | 0.3860in / 0.9804cm |
| 5 | -260F / -162C | 55F / 13C | 0.3860in / 0.9804cm |
| 6 | -260F / -162C | 55F / 13C | 0.3860in / 0.9804cm |
| 7 | -150F / -101C | 70F / 21C | 0.3855in / 0.9792cm |
| 8 | -150F / -101C | 70F / 21C | 0.3855in / 0.9792cm |
| 9 | -50F / -46C | 90F / 32C | 0.3850in / 0.9779cm |
| 10 | -50F / -46C | 90F / 32C | 0.3850in / 0.9779cm |

APPARATUS AND METHOD FOR MACHINING POLYMERS WITH CONTROLLED CROYGENIC COOLING

CROSS REFERENCE TO RELATED APPLICATIONS

This application is the National Stage of International Application No. PCT/US08/77144, filed Sep. 20, 2008, which claims the benefit of U.S. Provisional Application No. 60/994,787, filed Sep. 21, 2007, and U.S. Provisional Application No. 61/012,653, filed Dec. 10, 2007, which are both incorporated herein by reference in their entirety as if fully set forth.

PCT International Application No. PCT/US08/074,506, filed Aug. 27, 2008, is incorporated herein by reference in its entirety as if fully set forth.

BACKGROUND

Use of polymeric materials is gaining increased acceptance in the biomedical industry. Many polymeric parts for biomedical products (referred to herein as "biopolymers") are produced in small and medium-sized batches. Accordingly, due to the costs associated with tooling, machining of biopolymers represents a cost-effective alternative to molding or extruding. Unfortunately, the physical properties of some polymeric materials, tight tolerances required in many biomedical products, and process limitations associated with biopolymers (which will be imbedded in the human body) present challenges for conventional machining processes.

The machinability of polymeric materials depends primarily on material characteristics (glass transition temperature [Tg], melt temperature [Tm], molecular weight and viscosity), as well as machining process conditions (cutting speed, cutting edge radius, tool angles and tool surface tribological properties). The stiffness of most polymers is highly dependent upon temperature. As polymers are cooled through and below their Tg, their stiffness increases dramatically, typically by several orders of magnitude.

For polymers having a Tg near or below room temperature (e.g. acrylic-based hydrophobic copolymer, with a Tg of 5 degrees C. to 20 degrees C.), it is very difficult to produce a smooth, uniform machined surface if the polymer is machined at typical room temperature/indoor ambient temperatures (e.g., between 20 and 30 degrees C.). Improved cooling techniques are also need for polymers with Tg that are well above room temperature, such as polymethyl methacrylate (PMMA), having a Tg of 110 degrees C. to 120 degrees C., or polyetheretherketone PEEK, having a Tg of 138 degrees to 149 degrees C. Machining such polymers without adequate cooling can cause the material to smear, as the machining temperature gets above glass transition temperature. This can also cause increased burr formation, localized melting and surface waviness.

Efforts have been made to increase stiffness of polymers by lowering the temperature of the polymer using "ice-blocking," cold air guns and cryogenic cooling. Each of these cooling approaches has serious deficiencies that prevent them from being effective. Particularly for polymers with glass transition temperatures well below room temperature (e.g. silicone, with a Tg of −90° C. to −120° C.), ice-blocking and cold air guns cannot cool the polymer to a sufficiently low temperature. For example, machining of the acrylic-based hydrophobic blanks at room temperature with compressed air cooling results in significant tearing of the material, resulting in unacceptable surface finish (see FIG. 2A). In addition, any cooling technique that introduces moisture on a hydrophilic polymer and/or leaves a residue on a biopolymer will also be problematic.

Efforts have been made to use conventional cryogenic cooling techniques to cool polymers during a machining process. Such efforts have proven problematic due to, in part, the inability of conventional cryogenic cooling systems to provide a controlled cooling at temperatures well-above the vaporization temperature of the cryogenic fluid. Therefore, jetting of a cryogen on the part rapidly reduces part temperature to well below Tg, which can cause part cracking or brittle fracture during machining.

Dry machining of polymers, such as PEEK, can generate a significant amount of burrs. Current industry practices to remove burrs include time-consuming manual removal by brushing and jetting of abrasive solutions. Brushing at room temperature is often not effective because the machining process often leaves the burrs soft and pliable, due to their small mass. Jetting of abrasive solutions is problematic because it can cause removal of micro-features and/or melting of the material. Conventional cryogenic cooling techniques suffer from the same overcooling problems associated with cryogenic cooling during machining. Therefore, there is a need for an improved process for burr and flashing removal for machined polymers.

SUMMARY OF THE INVENTION

In one respect, the invention comprises a method comprising: maintaining the temperature of a portion a material at or below the glass transition temperature of the material using a resultant fluid comprising a throttling gas and a cryogenic fluid, the resultant fluid having a temperature that is substantially higher than the vaporization temperature of the cryogenic fluid; and machining the portion of the material while the temperature of the portion of the material is being maintained at or below the glass transition temperature of the material.

In another respect, the invention comprises a method comprising: combining a throttling gas and a cryogenic fluid, at least partially in liquid phase, to form a resultant fluid; discharging the resultant fluid through at least one nozzle onto at least a portion of a material, the resultant fluid containing no more than 10% (by volume) liquid phase cryogenic fluid when it is discharged from each of the at least one nozzle; machining the material; and continuing the discharging step throughout the machining step.

In yet another respect, the invention comprises a method comprising: machining a portion of a material; cooling at least the portion of the material so that the temperature of the portion of the material at the end of the machining step within a first temperature range, using a resultant fluid comprising a throttling gas and a cryogenic fluid at the material, the resultant fluid having a temperature substantially above the vaporization temperature of the cryogenic fluid, the first temperature range having a lower temperature limit that is no lower than ambient temperature and an upper temperature limit that is at or below the glass transition temperature of the material.

In yet another respect, the invention comprises A method comprising: discharging a resultant fluid onto a portion of a machined material that contains protuberances, the resultant fluid comprising a throttling gas and a cryogenic fluid, the cryogenic fluid having a temperature that is greater than the vaporization temperature of the cryogenic fluid; and brushing the portion of the machined material after the discharging step to remove at least some of the protuberances.

BRIEF DESCRIPTION OF THE DRAWINGS

FIG. 3A is a photograph of a part, made of PEEK, having a dry-machined slot formed therein;

FIG. 3B is a photograph of a part, made of the same material as the part shown in FIG. 3A, that was machined while being cooled by a temperature-controlled resultant fluid at cryogenic temperatures;

FIG. 4 is a schematic diagram illustrating an apparatus and process for brush deburring a machined part after cooling the burrs using a temperature-controlled resultant fluid at cryogenic temperatures;

DETAILED DESCRIPTION OF THE INVENTION

Figure 1:
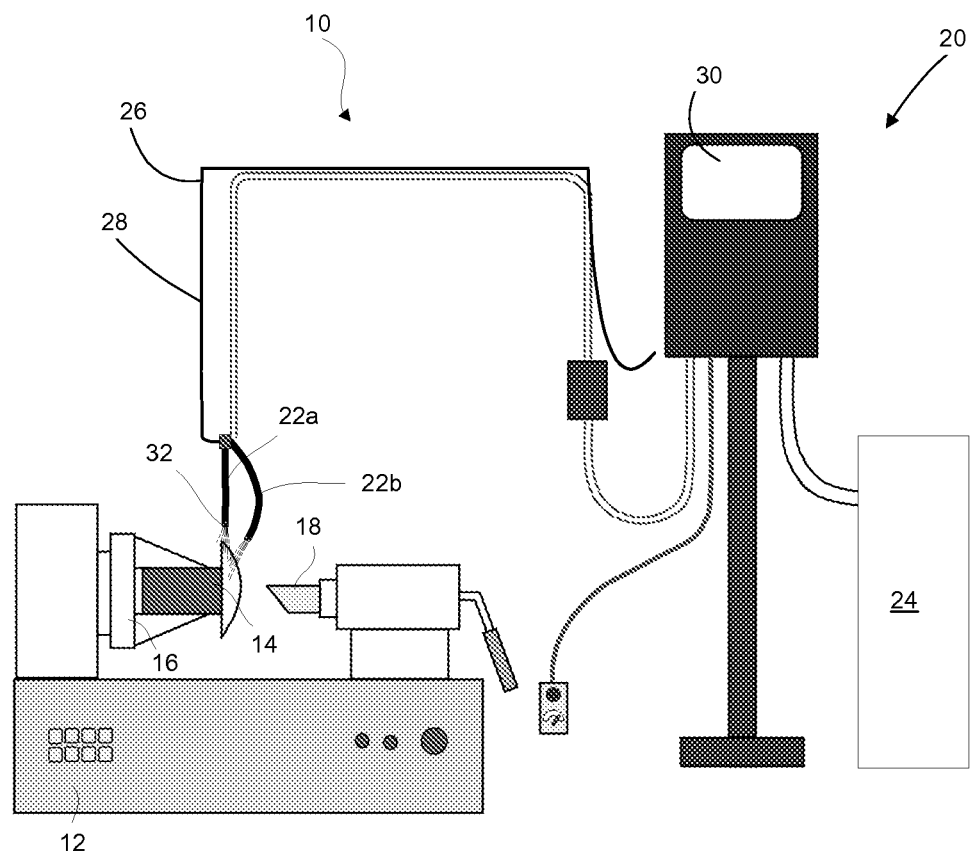
FIG. 1 is a schematic diagram of a first embodiment of a machining and cooling system.

The ensuing detailed description provides preferred exemplary embodiments only, and is not intended to limit the scope, applicability, or configuration of the invention. Rather, the ensuing detailed description of the preferred exemplary embodiments will provide those skilled in the art with an enabling description for implementing the preferred exemplary embodiments of the invention. It being understood that various changes may be made in the function and arrangement of elements without departing from the spirit and scope of the invention, as set forth in the appended claims.

To aid in describing the invention, directional terms may be used in the specification and claims to describe portions of the present invention (e.g., upper, lower, left, right, etc.). These directional terms are merely intended to assist in describing and claiming the invention and are not intended to limit the invention in any way. In addition, reference numerals that are introduced in the specification in association with a drawing figure may be repeated in one or more subsequent figures without additional description in the specification in order to provide context for other features. In the drawings, cross-hatching in a sectional view indicates a microporous material and hatching in a sectional view indicates non-microporous material.

In the specification, elements which are common to more than one disclosed embodiment of the invention are identified in the drawings using reference numerals that differ by factors of 100. For example, a first embodiment of a cryogenic delivery system is identified in the specification and in FIG. 1 by reference numeral 20 and a second embodiment of the cryogen delivery system is identified in the specification and in FIG. 2 by reference numeral 120. In addition, elements which are discussed in the specification with respect to one embodiment may be identified by reference numeral in other embodiments in which that element appears, but may not be independently referred to in the specification.

As used herein, the term "cryogenic fluid" is intended to mean a liquid, gas or mixed-phase fluid having a temperature less than −70 degrees C. Examples of cryogenic fluids include liquid nitrogen (LIN), liquid oxygen (LOX), liquid argon (LAR), liquid carbon dioxide and pressurized, mixed phase cryogens (e.g., a mixture of LIN and gaseous nitrogen).

As used herein, the term "nozzle" is intended to refer to one or more openings for discharging a fluid. Examples of nozzles include a single round opening, an array of openings, and an elongated slot.

As used in the appended claims, the term "machining" should be understood to include all types of machining operations including, but not limited to, turning, drilling, milling, shaping, planing, broaching, sawing, burnishing, grinding and brushing.

As used herein, the term "low Tg material" should be understood to mean a material having a glass transition temperature that is less than 30 degrees C.

As used herein, the term "protuberance" should be understood to mean pieces of waste material that protrude from a machined surface of a material, are a result of the machining process and remain attached to the material at the conclusion of a machine pass. Examples of protuberances include, but are not limited to, burrs, flashing and chips.

The many organic materials transition from rubber state to glass state over a temperature range, often a range of 5 to 15 degrees C. Therefore, the "glass transition temperature" of such materials could be more accurately described as a glass transition temperature range. Accordingly, for the purposes of this application, a temperature that is described as being "at or below" the glass transition temperature of a material should be understood to be no higher than the upper end of the glass transition temperature range for that material. For example, if a material having a Tg of 5 degrees C. to 20 degrees C. is described as being maintained at a temperature "at or below" the glass transition temperature, it should be understood that the material is maintained at a temperature of no greater than 20 degrees C.

Figure 2A:
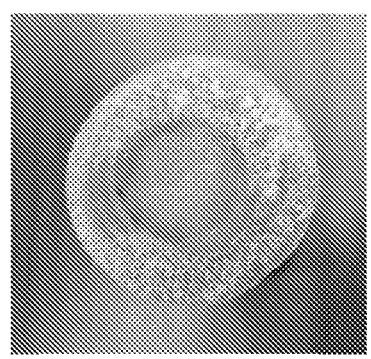
FIG. 2A is a photograph of a lens that was machined while being cooled with cold air.
Figure 2B:
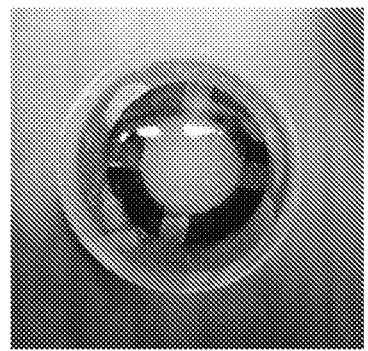
FIG. 2B is a photograph of a lens, made of the same material as the lens shown in FIG. 2A, that was machined while being cooled by a temperature-controlled resultant fluid at cryogenic temperatures.

Referring to FIG. 1, one embodiment of a machining and cooling system 10 is shown. The system 10 includes a lathe 12 for machining a polymeric lens 14 and a coolant delivery system 20 for cooling the lens 14 during the machining. As is conventional, the lathe 12 includes a chuck 16 which holds the lens 14 in position and a tool 18 is used to machine the surface of the lens 14 as it is rotated by the chuck 16. The tool 18 is movable along the axis of rotation of the chuck 16 (extending horizontally from left to right in FIG. 1), which allows it to machine a surface of a desired shape on the lens 14.

The coolant delivery system 20 is operationally configured to discharge a resultant fluid 32 (in most cases a mixture of a throttling gas and a cryogenic fluid) onto the lens 14. In order to enable control of the temperature of the resultant fluid, the coolant delivery system 20 of this embodiment is preferably substantially identical to the cryogenic coolant delivery system described in PCT International Application No. PCT/US08/074,506, filed Aug. 27, 2008, which is incorporated herein by reference. Accordingly, the coolant delivery system 20 includes a cryogen source, a throttling gas control and delivery assembly, a cryogenic fluid delivery assembly and a coolant discharge assembly. In this embodiment, the cryogen source is a single tank 24 containing a liquid cryogen (in this embodiment, liquid nitrogen). The cryogenic fluid delivery assembly preferably comprises a coaxial or triaxial delivery line and the coolant discharge assembly comprises two nozzles 22a, 22b. A control box 30 houses a programmable logic controller (PLC) and the other components of the throttling gas control, delivery assembly and cryogenic fluid delivery assembly, as described in PCT International Application No. PCT/US08/074,506.

The nozzles 22a, 22b are positioned and oriented to discharge the resultant fluid 32 onto the lens 14 and, preferably, are directed at the portion of the lens 14 that will be machined by the tool 18. Any number of nozzles could be used in alternate embodiments. It is preferable, however, that the nozzles 22a, 22b provide a relatively uniform degree of cooling throughout the portion of the lens 14 that is to be machined. In addition, it is preferable that at least one of the nozzles spray resultant fluid 32 in the direction of movement of the tool 18, so that changes in the amount of resultant fluid 32 reaching the lens 14 are minimized as the shape of the lens 14 changes during the machining process.

It is also preferable that the coolant delivery system 20 is operated in a manner that results in little or no cryogenic fluid contacting the surface of the lens 14 in liquid phase. In order to prevent liquid phase cryogenic fluid from contacting the lens 14, it is preferable to operate the coolant delivery system 20 in a manner that results in no more than a 10% (by volume) liquid phase fraction in the resultant fluid 32 when the resultant fluid 32 exits either of the nozzles 22a, 22b. More preferably, the coolant delivery system 20 is operated in a manner that all liquid phase cryogenic fluid vaporizes before exiting either of the nozzles 22a, 22b. This can be accomplished by maintaining a throttling gas flow rate at a level sufficient to insure such vaporization. The mechanism for controlling throttling gas flow rate is fully disclosed in PCT International Application No. PCT/US08/074,506.

In tests performed using a prototype of the coolant delivery system 20 using liquid nitrogen as the cryogenic fluid, resultant fluid temperatures as low as −272 degrees F./−169 degrees C. were achievable without any significant liquid phase cryogenic fluid being discharged from the nozzles 22a, 22b. Based on these tests, resultant fluid temperatures as low as −310 degrees F./−190 degrees C. can be achieved with little or no cryogenic fluid contacting the surface of the lens 14 in liquid phase.

As will be described in greater detail herein, the coolant delivery system 20 can be advantageously implemented, in accordance with the present invention, to provide improved control over the temperature of a machined part both during and at the conclusion of the machining process.

Before machining the lens 14, a desired temperature range for the portion of the lens 14 being machined is determined. The desired temperature range is the range of temperatures at which machining of the lens 14 will result in a smooth, uniform machined surface (see FIG. 2B). It has been determined that, for most materials, the upper end (temperature) of the desired temperature range is no higher than the glass transition temperature for the material being machined and, more preferably, is at least 20 to 30 degrees below the glass transition temperature for the material being machined. Many materials will produce a smooth machined surface when machined at (or slightly below) the glass transition temperature, but the surface will be wavy (non-uniform) due to lack of subsurface stiffness.

The desired temperature range will vary from material to material and may also vary depending upon other machining conditions, such as depth of cut, cutting speed, and ambient temperature, for example. In addition, as a practical matter, the temperature of the lens 14 (for the purposes of determining and monitoring the desired temperature range) will be the surface temperature of the portion of the lens 14 that is to be cut during the machining process. In this embodiment, the lens 14 is an acrylic-based hydrophobic material having a glass transition temperature between −5 degrees C. and 15 degrees C. The desired temperature range for the portion of the lens 14 to be machined was determined to be between −40 degrees C. and −30 degrees C.

It has also been determined that, in order to achieve the desired temperature range for the lens 14, the set temperature for the resultant fluid 32 will typically be significantly lower than the desired temperature range, often on the order of about 100 degrees C. lower than the desired temperature range for the part being machined. The appropriate set temperature for the resultant fluid 32 that will maintain the lens 14 within the desired temperature range during machining is preferably determined using temperature measurements of the surface of the lens 14 via any suitable temperature measurement device, such as infrared sensors or thermocouples, for example. The appropriate set temperature for the resultant fluid 32 can be determined and set in advance (e.g., for repetitive machining of the same material), or can be determined by linking a suitable temperature feedback device to the PLC and programming the PLC to adjust the set temperature of the resultant fluid 32 to keep the temperature of the lens 14 within the desired temperature range.

The manner in which the coolant delivery system 20 sets and maintains the set temperature of the resultant fluid 32 is disclosed in PCT International Application No. PCT/US08/074,506 which, as set forth above, is incorporated herein by reference. The coolant delivery system 20 is capable for maintaining the temperature of the resultant fluid 32 within 5 degrees C. of the set temperature under some operating conditions, and within 10 degrees C. of the set temperature under nearly all typical operating conditions.

Figures 7, 8:
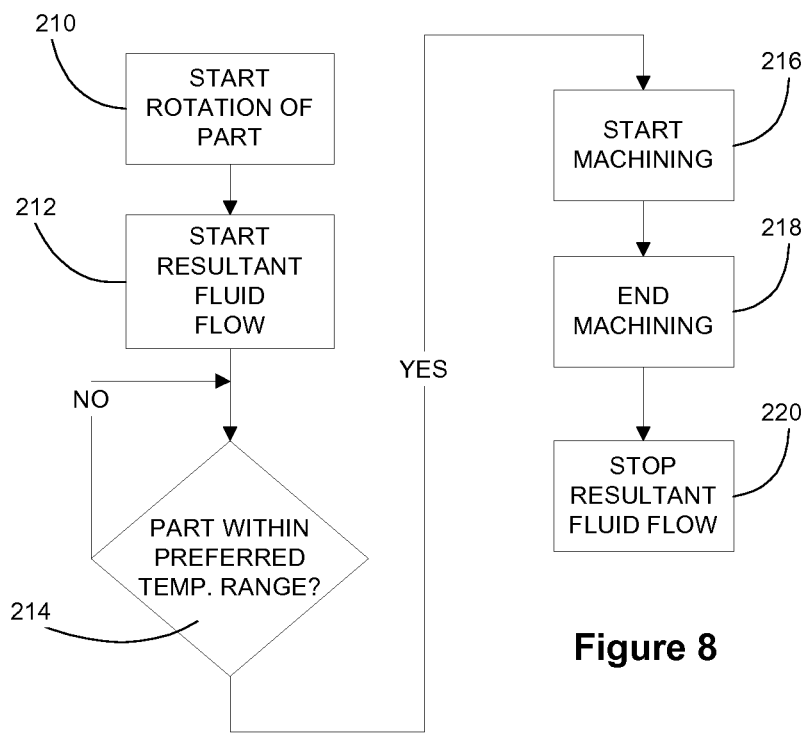
FIG. 7 is a table showing data from test performed on ten samples of a machined part, some of the parts being dry-machined and others machined using three different resultant fluid set temperatures.
FIG. 8 is a flow chart showing one method of cooling a low Tg material while the part is machined.

FIG. 8 shows a flow chart of one method of machining the lens 14 (or another low Tg material) in accordance with the present invention. First, the chuck 16 is engaged so that the lens 14 begins to rotate (step 210). Then, discharge of the resultant fluid 32 at a set temperature onto the lens 14 is commenced (step 212) and continues until the surface of the lens 14 is cooled to within the desired temperature range (step 214). This can be accomplished by either using a sensor that monitors the temperature of the lens 14 and is connected to the PLC (which could also adjust the set temperature if needed), or by discharging the resultant fluid 32 at a set temperature for a period of time that has previously been determined to bring the lens 14 to within the desired temperature range. Once the lens 14 is within the desired temperature range, machining of the lens 14 (using tool 18) begins (step 216). The discharge of resultant fluid 32 continues during the machining step 216. When machining is completed (step 218), the discharge of the resultant fluid 32 is stopped (step 220) and the lens 14 can be removed from the chuck 16.

The coolant delivery system 20 could also be advantageously used to improve the machined characteristics of materials having glass transition temperatures that are higher than room temperature (referred to herein as "high Tg materials"). Frictional heat generated by the machining process can raise the temperature of the machined part above the glass transition temperature, which can result in localized melting (causing smearing) and increased generation of burrs during the machining process. The controlled cryogenic cooling capabilities of the coolant delivery system 20 of the present invention can be used to keep the temperature of the machined material well below the glass transition temperature of a high Tg material, which has been shown to improve the characteristics of machined, high Tg materials.

For example, conventional dry machining of PEEK (having a glass transition temperature of 138 degrees C. to 149 degrees C.) generates a significant amount of burrs (see FIG. 3A). As shown in FIG. 3B, significantly fewer burrs were formed when the same machining pass shown in FIG. 3A is performed while the portion of the material being machined is cooled by the resultant fluid 32 from the coolant delivery system 20.

Referring to FIG. 4, the controlled cryogenic cooling capabilities of the coolant delivery system 120 can also be advantageously used to remove any burrs, flashing, chips or other undesirable protuberances that remain at the conclusion of the primary machining process (i.e., cutting, boring, milling, etc.). In the interest of simplicity, only cryogen delivery line 126 and the nozzle 122 are shown. It should be understood that the coolant delivery system 120 also includes the same components as the coolant delivery system 20 of the first embodiment.

A machined part 114 having burrs 134a, 134b, 134c located thereon is shown in FIG. 4. The nozzle 122 is used to spray a resultant fluid onto the burrs 134a, 134b, 134c, which hardens the burrs 134a, 134b, 134c and makes them more brittle. A brush 136 is then passed over the surface of the machined part 114, which removes the burrs 134a, 134b, 134c. Optionally, the nozzle 122 may also be configured to discharge some resultant fluid 132 onto the brush 136, which stiffens the brush 136. The amount of cooling required to reduce the temperature of the burrs 134a, 134b, 134c to the desired temperature range is significantly less than the amount of cooling required, due to the small cross-sectional shape of the burrs 134a, 134b, 134c relative to the rest of the machined part.

Figure 5A:
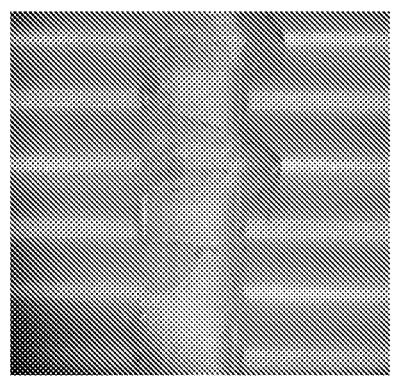
FIG. 5A is a photograph of a part, made of PEEK, having a dry-machined slot formed therein, after being brush deburred without any cooling.
Figure 5B:
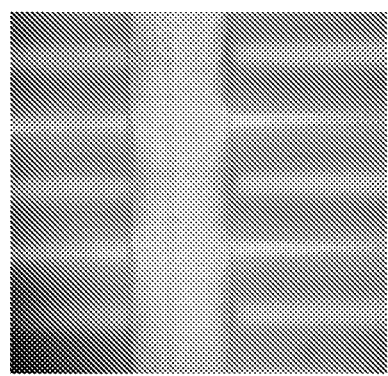
FIG. 5B is a photograph of a part, made of the same material as the part shown in FIG. 3A, that was machined while being cooled by a temperature-controlled resultant fluid at cryogenic temperatures and brush deburred after cooling the burrs with a temperature-controlled resultant fluid at cryogenic temperatures.

The improvement in surface quality of polymeric parts made using the controlled cryogenic cooling method of the present invention (both during machining and deburring) are apparent in FIGS. 5A through 6B. FIG. 5A shows a part (made of PEEK) after a slot is dry machined therein (i.e., without cryogenic cooling) and the part has been deburred using conventional brush deburring techniques. FIG. 5B shows a part made of the same material after the same slot is machined therein while being cooled using the controlled cryogenic cooling method of the present invention and the part has been deburred by brushing the surface of the part after cryogenically cooling the surface using a resultant fluid at a temperature of −230 degrees F./−146 degrees C. While the part shown in FIG. 5A still has several burrs attached and shows some irregularities along the edge of the slot, the part shown in FIG. 5B has no burrs and much more uniform slot edges.

Figure 6A:
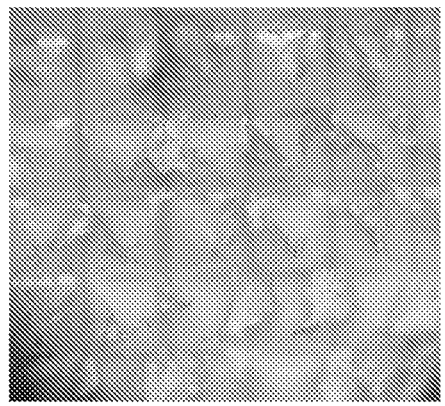
FIG. 6A is a photograph of a part, made of PEEK, which was dry-milled and brush deburred without any cooling.
Figure 6B:
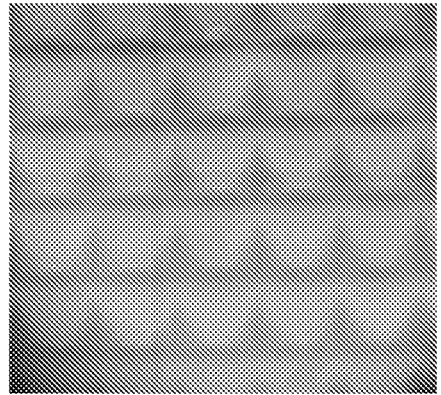
FIG. 6B is a photograph of a part, made of the same material as the part shown in FIG. 3A, that was milled while being cooled by a temperature-controlled resultant fluid at cryogenic temperatures and brush deburred after cooling the burrs with a temperature-controlled resultant fluid at cryogenic temperatures.

Similarly, FIG. 6A shows a part (made of PEEK) after being milled without cryogenic cooling and being deburred using conventional brush deburring techniques. FIG. 6B shows a part made of the same material after the same pattern is milled therein while being cooled using the controlled cryogenic cooling method of the present invention and the part has been deburred by brushing the surface of the part after cryogenically cooling the surface. While the part shown in FIG. 6A still has several burrs attached, the part shown in FIG. 6B has no burrs.

The controlled cryogenic cooling capabilities of the cryogenic delivery system can also be advantageously used for the purpose of providing greater control over the temperature of a high Tg material, even in applications in which the overall temperature of the material does not exceed its glass transition temperature during the machining process. Due to frictional heat and heat retained in tooling components, the temperature of most machined parts is elevated during the machining process, often well above ambient temperature. Even in cases in which such elevated temperatures do not exceed the glass transition temperature of the material, they can adversely affect accuracy and efficiency. Temperature elevation can make handling and/or measurement of machined parts difficult at the end of the machining process—until the parts have cooled. In addition, the amount of temperature elevation in machined parts may increase in machining processes in which multiple parts are machined in succession using the same tool. This can result in undesirable variation in the dimensions of the machined part when it returns to ambient temperature.

An example of the effects of elevation of machined part temperature and the benefits of cooling such parts is shown in FIG. 7. FIG. 7 is a table showing data relating to a part made of PEEK that is machined at a rotational speed of 650 surface feet per minute (198 surface meters per minute) and a feed rate of 0.004 inches (0.12 centimeters) per turn. The ambient temperature was about 21 degrees C. and each part was allowed to cool to ambient temperature before being measured. Samples 1 through 3 were machined without being cooled during the machining process. Samples 4 through 6 were cooled during machining by a resultant fluid at a set temperature of −260 degrees F. (−162 degrees C.). Samples 7 and 8 were cooled during machining by a resultant fluid at a set temperature of −150 degrees F. (−101 degrees C.). Samples 9 and 10 were cooled during machining by a resultant fluid at a set temperature of −50 degrees F. (−46 degrees C.).

The test results show that samples that were cooled during the machining process (Samples 4 through 10), which held the temperature of the each part closer to ambient temperature than without cooling, exhibited less size variation than parts that were not cooled (Samples 1 through 3). It is also noteworthy that a size difference of 0.001 feet occurred between Sample 1 (which reached a temperature of 105 degrees F./45 degrees C. after machining) and Sample 6 (which only reached a temperature of 55 degrees F./13 degrees C. after machining). This illustrates the size variations that can occur if the temperature of machined parts is allowed to escalate when multiple parts are machined in succession using the same tool.

When machining a high Tg material, it is preferable to maintain the temperature of the high Tg material during machining within a temperature range that is between the ambient temperature of the machining environment and the glass transition temperature of the high Tg material. The upper end of the temperature range is also preferably a temperature at which the machined part could be handled without protective equipment (e.g., not higher than 100 degrees F./38 degrees C.). In most cases, cooling a high Tg material below room temperature would not be detrimental to the quality of the machined product, however, such additional cooling would increase cooling costs and would provide little, if any, additional benefits.

As such, an invention has been disclosed in terms of preferred embodiments and alternate embodiments thereof. Of course, various changes, modifications, and alterations from the teachings of the present invention may be contemplated by those skilled in the art without departing from the intended spirit and scope thereof. It is intended that the present invention only be limited by the terms of the appended claims.

The invention claimed is:

1. A method comprising:
   maintaining the temperature of a portion a material at or below the glass transition temperature of the material using a resultant fluid comprising a throttling gas and a cryogenic fluid, the resultant fluid having a temperature that is substantially higher than the vaporization temperature of the cryogenic fluid; and
   machining the portion of the material while the temperature of the portion of the material is being maintained at or below the glass transition temperature of the material.

2. The method of claim 1, further comprising
   prior to the machining step, cooling the portion of the material being machined to a first temperature that is at or below the glass transition temperature of the material using the resultant fluid.

3. The method of claim 1, wherein the machining step comprises machining a portion of a material having a glass transition temperature that is below 30 degrees C.

4. The method of claim 1, wherein the maintaining step comprises maintaining the temperature of a portion of a material, the material comprising a biopolymer.

5. The method of claim 1, wherein the machining step comprises brushing the material to remove protuberances located on the material.

6. The method of claim 1, wherein the maintaining step further comprises discharging the resultant fluid onto the material using a nozzle in a manner that results in vaporization of any liquid phase portion of the cryogenic fluid before the resultant fluid contacts the material.

7. The method of claim 1, wherein the maintaining step further comprises discharging the resultant fluid from at least one nozzle, the resultant fluid containing no more than 10% (by volume) liquid phase when it is discharged from the at least one nozzle.

8. The method of claim 1, wherein:
   the maintaining step further comprises maintaining the temperature of a portion a material at least 20 degrees C. below the glass transition temperature of the material; and
   the machining step further comprises machining the portion of the material while the temperature of the portion of the material is being maintained at least 20 degrees C. below the glass transition temperature of the material.

9. The method of claim 1, wherein the maintaining step further comprises maintaining the temperature of a portion a material below the glass transition temperature of the material using a resultant fluid comprising a throttling gas and a cryogenic fluid, the resultant fluid having a temperature that is maintained within 10 degrees C. of a set temperature.

10. The method of claim 9, wherein the maintaining step further comprises maintaining the temperature of a portion a material below the glass transition temperature of the material using a resultant fluid comprising a throttling gas and a cryogenic fluid, the cryogenic fluid having a vaporization temperature that is substantially lower than the set temperature.

11. A method comprising:
    combining a throttling gas and a cryogenic fluid, at least partially in liquid phase, to form a resultant fluid;
    discharging the resultant fluid through at least one nozzle onto at least a portion of a material, the resultant fluid containing no more than 10% (by volume) liquid phase cryogenic fluid when it is discharged from each of the at least one nozzle;
    machining the material; and
    continuing the discharging step throughout the machining step.

12. The method of claim 11, wherein the discharging step further comprises discharging the resultant fluid through at least one nozzle onto at least a portion of a material, the resultant fluid being discharged at a temperature that is within 10 degrees C. of a set temperature, the set temperature being greater than the vaporization temperature of the cryogenic fluid.

13. A method comprising:
    machining a portion of a material; and
    cooling at least the portion of the material so that the temperature of the portion of the material at the end of the machining step is within a first temperature range, using a resultant fluid comprising a throttling gas and a cryogenic fluid directed at the material, the resultant fluid having a temperature substantially above the vaporization temperature of the cryogenic fluid, the first temperature range having a lower temperature limit that is no lower than ambient temperature and an upper temperature limit that is at or below the glass transition temperature of the material.

14. The method of claim 13, wherein the cooling step comprises cooling at least the portion of the material so that the temperature of the portion of the material at the end of the machining step is within a first temperature range, using a resultant fluid comprising a throttling gas and a cryogenic fluid directed at the material, the resultant fluid having a temperature that is greater than the vaporization temperature of the cryogenic fluid, the first temperature range having a lower temperature limit that is no lower than ambient temperature and an upper temperature limit that is no greater than 100 degrees C.

15. A method comprising:
    discharging a resultant fluid onto a portion of a machined material that contains protuberances, the resultant fluid comprising a throttling gas and a cryogenic fluid, the cryogenic fluid having a temperature that is greater than the vaporization temperature of the cryogenic fluid; and
    brushing the portion of the machined material after the discharging step to remove at least some of the protuberances.

* * * * *